US011411920B2

(12) United States Patent
Morton et al.

(10) Patent No.: US 11,411,920 B2
(45) Date of Patent: Aug. 9, 2022

(54) METHOD AND SYSTEM FOR CREATING A SECURE PUBLIC CLOUD-BASED CYBER RANGE

(71) Applicant: Circadence Corporation, Boulder, CO (US)

(72) Inventors: Gary D. Morton, Erie, CO (US); Paul Randy Thornton, Tupelo, MS (US); Ryan Pressley, Austin, TX (US)

(73) Assignee: Circadence Corporation, Boulder, CO (US)

( * ) Notice: Subject to any disclaimer, the term of this patent is extended or adjusted under 35 U.S.C. 154(b) by 37 days.

(21) Appl. No.: 15/929,633

(22) Filed: May 13, 2020

(65) Prior Publication Data

US 2020/0366650 A1 Nov. 19, 2020

Related U.S. Application Data (60) Provisional application No. 62/848,916, filed on May 16, 2019.

(51) Int. Cl.
*G06F 21/00* (2013.01)
*H04L 9/40* (2022.01)

(52) U.S. Cl.
CPC ...... *H04L 63/0272* (2013.01); *H04L 63/0218* (2013.01)

(58) Field of Classification Search
None
See application file for complete search history.

(56) References Cited

U.S. PATENT DOCUMENTS

| 8,108,931 | B1* | 1/2012 | Witten | G06F 21/14 726/25 |
| 8,429,630 | B2* | 4/2013 | Nickolov | G06Q 30/0283 717/148 |
| 8,572,247 | B2* | 10/2013 | Larson | H04L 61/2092 709/225 |
| 10,777,093 | B1* | 9/2020 | Brueckner | G09B 7/00 |
| 2004/0268147 | A1* | 12/2004 | Wiederin | G06F 21/567 726/12 |
| 2006/0203736 | A1* | 9/2006 | Molen | H04L 12/2823 370/245 |

(Continued)

OTHER PUBLICATIONS

Cyberbit, Cloud Based Cyber Range, https://www.cyberbit.com/solutions/cyber-range/cloud-cyber-range/, accessed Aug. 18, 2020, 10 pages.

*Primary Examiner* — Maung T Lwin
(74) *Attorney, Agent, or Firm* — Weide & Miller, Ltd.

(57) ABSTRACT

Disclosed are methods and systems for creating a secure and dynamic public cloud-based cyber range by first creating a plurality of subscription-based virtual private networks on each of a plurality of public computing platforms. The public computing platforms may be accessible via a network, and may include at least one server. At least one virtual cyber range may be created relative to each of said private networks. Each cyber range may include a virtual network of one or more virtual computing components. The network traffic of said cyber ranges may be managed via at least one master controller to isolate said cyber range from a remainder of said public computing platforms not accessible via said network.

17 Claims, 5 Drawing Sheets

(56) References Cited

U.S. PATENT DOCUMENTS

| | | | |
|---|---|---|---|
| 2006/0247060 A1* | 11/2006 | Hanson | G07F 17/3276 463/42 |
| 2007/0005954 A1* | 1/2007 | Skemer | H04L 63/0428 713/153 |
| 2010/0306773 A1* | 12/2010 | Lee | G06F 9/5077 718/1 |
| 2019/0245714 A1* | 8/2019 | Ansari | H04L 12/66 |

\* cited by examiner

METHOD AND SYSTEM FOR CREATING A SECURE PUBLIC CLOUD-BASED CYBER RANGE

RELATED APPLICATION DATA

This application claims priority to U.S. Application Ser. No. 62/848,916, filed May 16, 2019, which is incorporated herein by reference in its entirety.

FIELD OF THE INVENTION

The present invention relates to the creation of cyber ranges.

BACKGROUND OF THE INVENTION

A cyber range is a virtual environment used to configure cyber training scenarios, facilitate activities associated with training scenarios, and support evaluation activities. The purpose of a cyber range is to create an environment where participants can safely practice with the latest cyber warfare tools and against the latest cyber threats without any security concerns or ramifications to existing operational systems.

Figure 1:
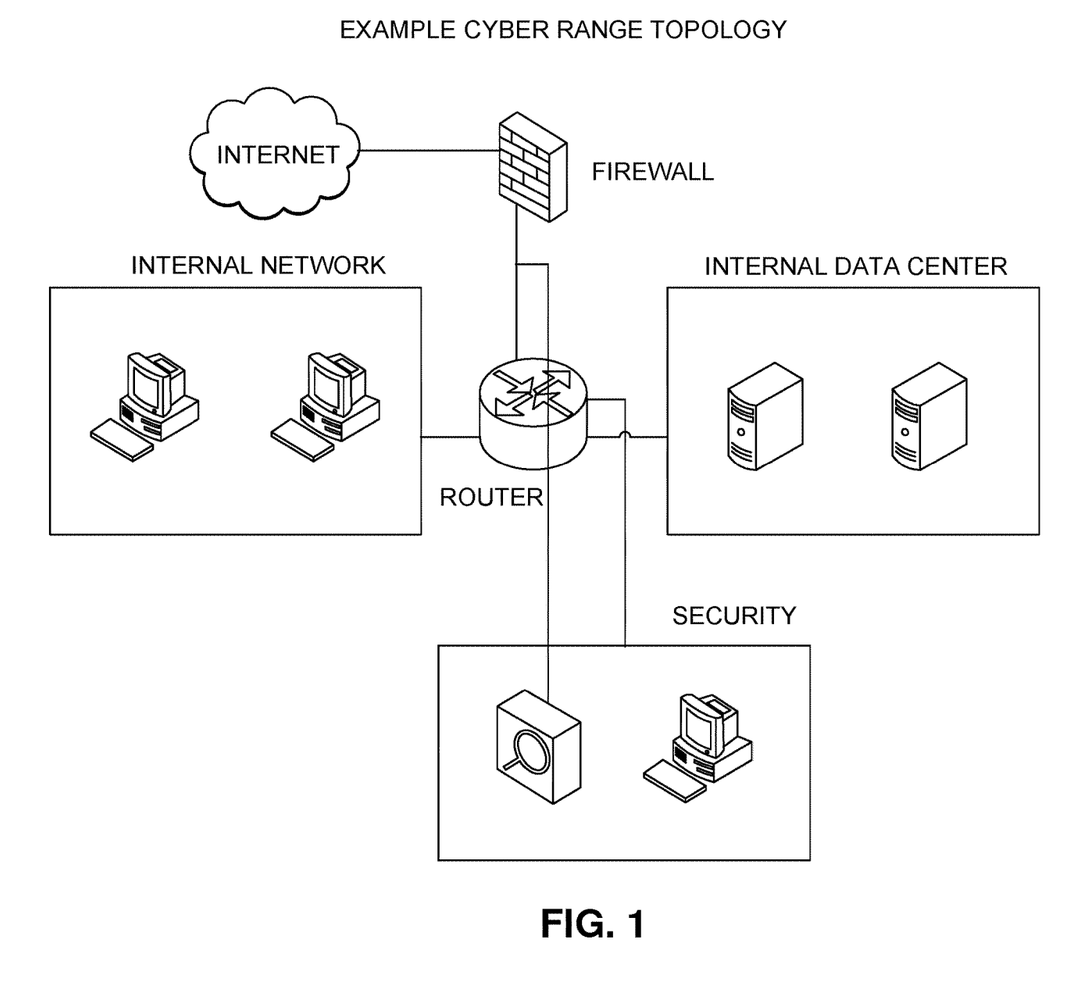
FIG. 1 schematically illustrates the topology of a prior art cyber range.

As illustrated in FIG. 1, existing cyber ranges utilize virtual environments to provide a practice environment where cyber warriors or IT professionals can hone their skills.

In prior art systems, a cloud provider provides technology to create a private network environment as the foundation of the cyber range. This typically involves the use of third party software packages such as Azure's Virtual Network (VNET) or AWS's Virtual Private Cloud (VPC) to create a dedicated private network environment.

Existing public cloud provided private network environments have severe limitations and are not sufficient to create a training environment where malware and malicious users are allowed to roam in order to experience a wide range of training scenarios. Other limitations of cyber ranges relate to problems associated with complex training scenarios, including a lack of support for sophisticated-networking topologies found in many physical networks.

Further, network traffic analysis and forensics is a core capability required in a cyber range. In order to support that specific cyber range requirement, network traffic must be routed through the virtualized range the same way it would in a physical instantiation. However, implementing public clouds within the cyber range pose a challenge given routing is handled by the cloud provider.

Traffic needs to be forced through in-range routers, firewalls, and switches when traversing between cyber range networks without artifacts of the underlying public cloud routing. In order to eliminate the limitation of the prior art, the described invention creates specialized routes to steer traffic through the correct sequence of virtual machines to emulate the expected layer 3 routing.

Typically in the real world, network traffic analyzing devices (IDS, IPS, etc.) are used to detect anomalous behaviors. These devices typically use port mirrors or port spans off of routers and firewalls to capture all ingress and egress traffic coming in and out of the network(s) they are monitoring. Public cloud providers do not support this requirement natively.

A need exists to address these and other issues associated with existing cyber ranges.

SUMMARY OF THE INVENTION

Aspects of the invention comprise methods, systems and devices for creating a public cloud-based cyber range which is preferably secure, dynamic and realistic.

One aspect of the invention is a public cloud-based cyber range, e.g. one which is implemented relative to existing public cloud resources and is not based upon private resources.

In one embodiment, limitations associated with the scalability of the cyber range relative to such public clouds is overcome by utilizing multiple subscriptions.

One aspect of the invention is a secure public cloud-based cyber range where threats and other cyber activities are contained and unable to breach the range perimeter into the public domain.

Another aspect of the invention is a cyber range where activities can be paused and restored, such as by allowing participants to continue their event from a known state at a later date.

Other aspects of the invention comprise a public cloud-based cyber range which supports realistic networking, and which supports dynamic range services, and where the cyber range can readily be created, destructed and modified.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods, systems and devices for creating a public-cloud based cyber range which is preferably secure, dynamic and realistic.

Public Cloud-Based Cyber Range

In a preferred embodiment, a cyber range is provided and supported. The cyber-range is public cloud-based. In contrast to the prior art where a cyber-range provider creates and uses their own network infrastructure to support a cyber range (a "private" cyber range), in accordance with the invention, a cyber range is created and supported via one or more existing, publicly accessible platforms or networks.

This aspect of the invention has numerous advantages over the prior art. First, "private" cyber ranges are expensive to create and are not readily scalable—either up or down in size. Also, the costs to a user of such a private range are generally higher because only the users of the range are dividing up the cost of the user of the associated supporting infrastructure.

On the other hand, in accordance with the invention, the use of public clouds allows the size of the cyber range to easily be scaled up or down because the existing infrastructure already exists and does not need to be changed by the cyber range provider. Also, the costs to the users can be much lower because other users of the associated public infrastructure for other purposes lowers the pro-rata cost thereof to all users.

Figure 3:
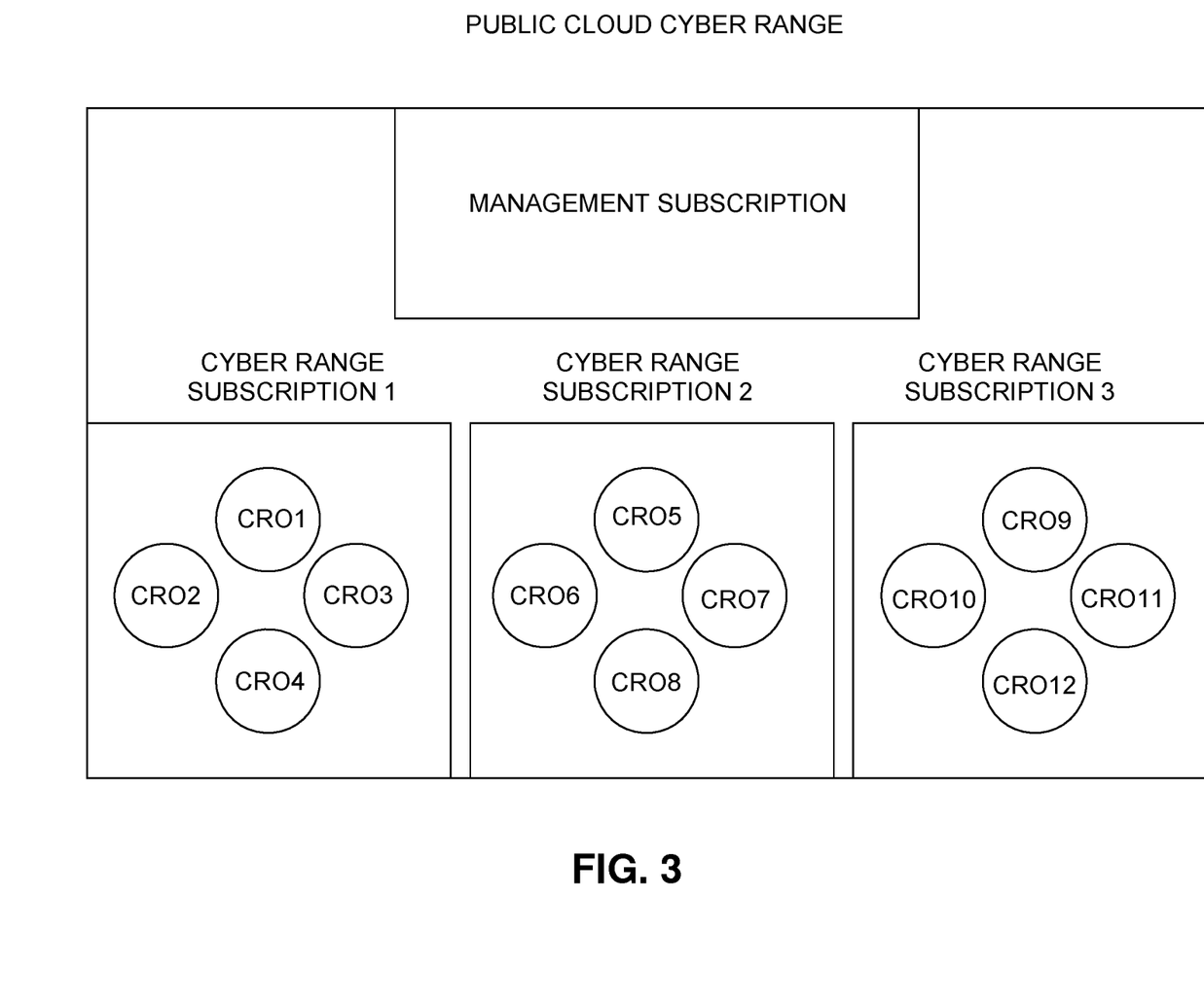
FIG. 3 illustrates aspects of load balancing in a public cloud-based cyber range in accordance with an embodiment of the invention.

In some embodiments, public cloud providers limit the number of private networks that a customer can operate at any one time, which would thus normally restrict the number of cyber ranges that can be launched concurrently. In one embodiment which utilizes Microsoft's AZURE virtual network construct, which is subscription based, multiple subscriptions are used to generate a public cloud-based range of the desired size/scale. In one embodiment, In addition, in one embodiment load balancing is implemented relative to the cyber range, illustrated in FIG. 3, to scale the system to support expanded training environment scenarios.

Public Cloud-Based Cyber Range Security

One aspect of the invention creates a secure public cloud-based cyber range—e.g. one where threats and other cyber activities are contained and unable to breach the range perimeter into the public domain (e.g. whereby activities occurring within the range are isolated or contained).

Another aspect of the invention locks down access to and from the cyber range to restrict incoming and outgoing traffic to specific protocols and known "good" agents.

Figure 2:
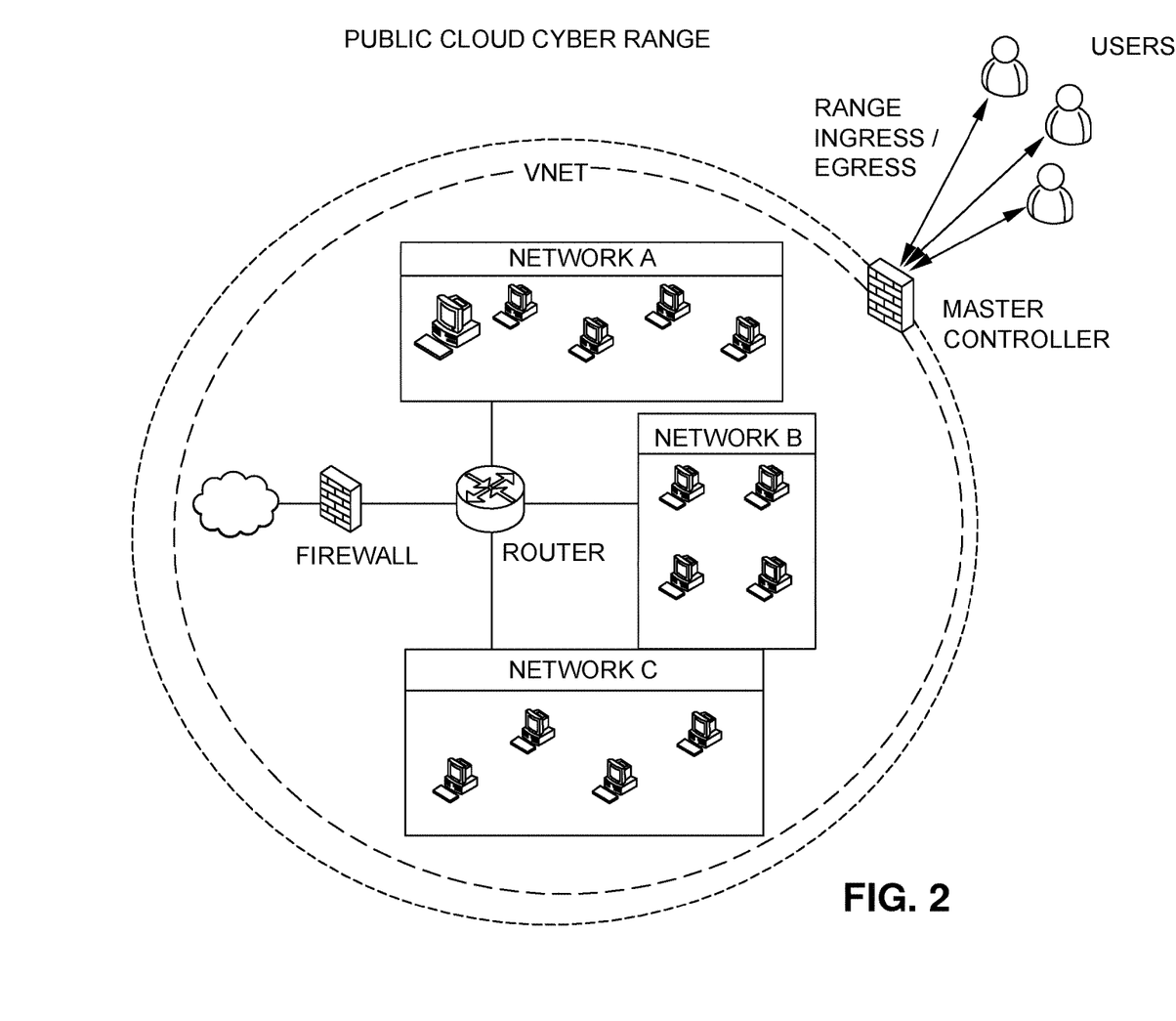
FIG. 2 schematically illustrates aspects of a configuration of a private network-based cyber range.

The described invention uses a master controller to manage the ingress/egress of network traffic and further isolate the cyber range from the rest of the public cloud. See FIG. 2.

Another aspect of the invention enables users of the system to go beyond the limitations of private networks associated with the configuration of cyber ranges, wherein the number of cyber ranges that can be launched concurrently is no longer restricted.

An additional aspect of the invention locks down the system to restrict incoming and outgoing traffic to specific protocols and known "good" agents by using a master controller to handle the ingress/egress network traffic and further isolate the cyber range from the rest of the public cloud.

Dynamic Cyber Range

In a preferred embodiment of the invention support for common network appliances (virtual) is provided to create a high fidelity cyber training practice environment.

Another aspect of the invention is the ability to create, destroy and reconstruct the range environment to enable participants to repeatedly practice with and against the latest weapons and tactics.

Another aspect of the invention provides traffic capture forensics functionality to show the expected host and routing information and flows through the cyber range's virtual routers and switches during live training scenarios.

Another aspect of the invention provides port mirroring via firewalls, routers, and switches to support network monitoring and analysis systems such as Intrusion Detection Systems (IDS) and Intrusion Prevention Systems (IPS) to analyze all of the cyber range internal networks' traffic.

Cyber Range Creation and Destruction

Another aspect of the invention includes a converter to convert cyber range definitions into cloud specific characteristics to efficiently replicate specific environments repeatedly.

Other aspects of the invention include installing and triggering malware or other threats and varying the internal network and system configuration.

Systems Virtualization and Isolation

Figure 4:
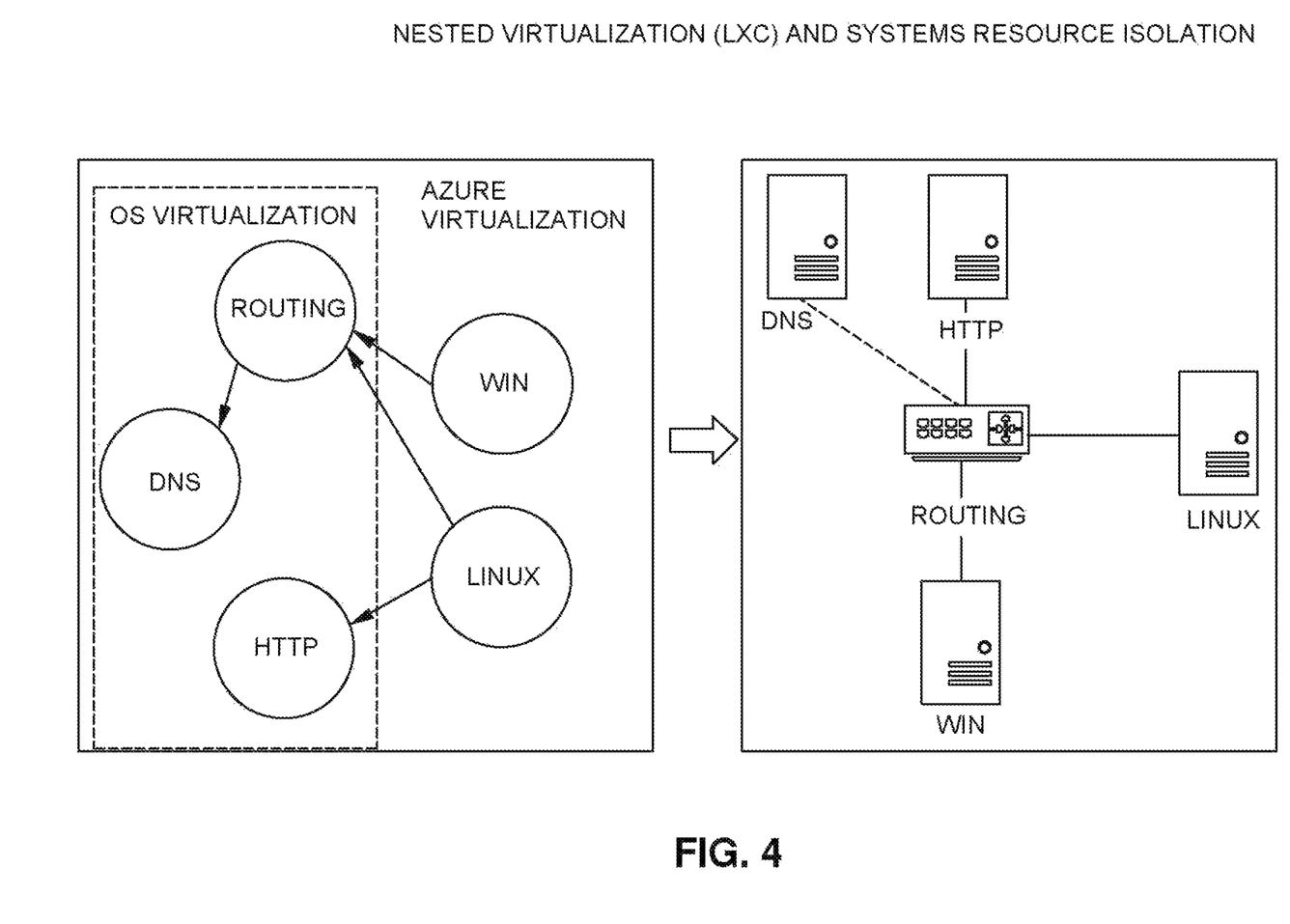
FIG. 4 illustrate aspects of asset emulation in a public cloud-based cyber range of the invention.

Another aspect of the invention is the implementation of nested virtualization (LXC) and systems resource isolation to emulate physically separate assets within the cyber range. The ranges implemented by the described invention combine Azure native virtual-machines with nested Linux system virtual machines to provide additional endpoint and routing services on the network as illustrated in FIG. 4.

Realistic Networking

Another aspect of the invention eliminates the limitation of public cloud providers by providing a cyber range environment that supports a logical mirror capability that can be run off any of the routers or firewalls.

Cyber Range Suspend and Resume

Another aspect of the invention is to pause or suspend a range and later resume cyber range training activities from a specific state and point in time where it had been suspended. The presented invention allows players to stop and come back later and continue from that point makes completing longer, more complex training exercises more manageable.

Dynamic Ranges

Another aspect of the invention allows the operator to change the cyber range on the fly due to situational changes or updated training objectives. Such changes may vary from adding a new system to changing the topology by adding a new network of networks. The added (or removed) systems can be virtual or physical depending on the user's cyber training requirements.

The described invention provides functionality to support dynamic ranges from a public cloud to enable hybrid and multi-cloud cyber ranges along with hardware in the loop. Changes in configuration can either be manually initiated by a trainer, administrator, or an AI agent based on mission play based heuristics.

Figure 5:
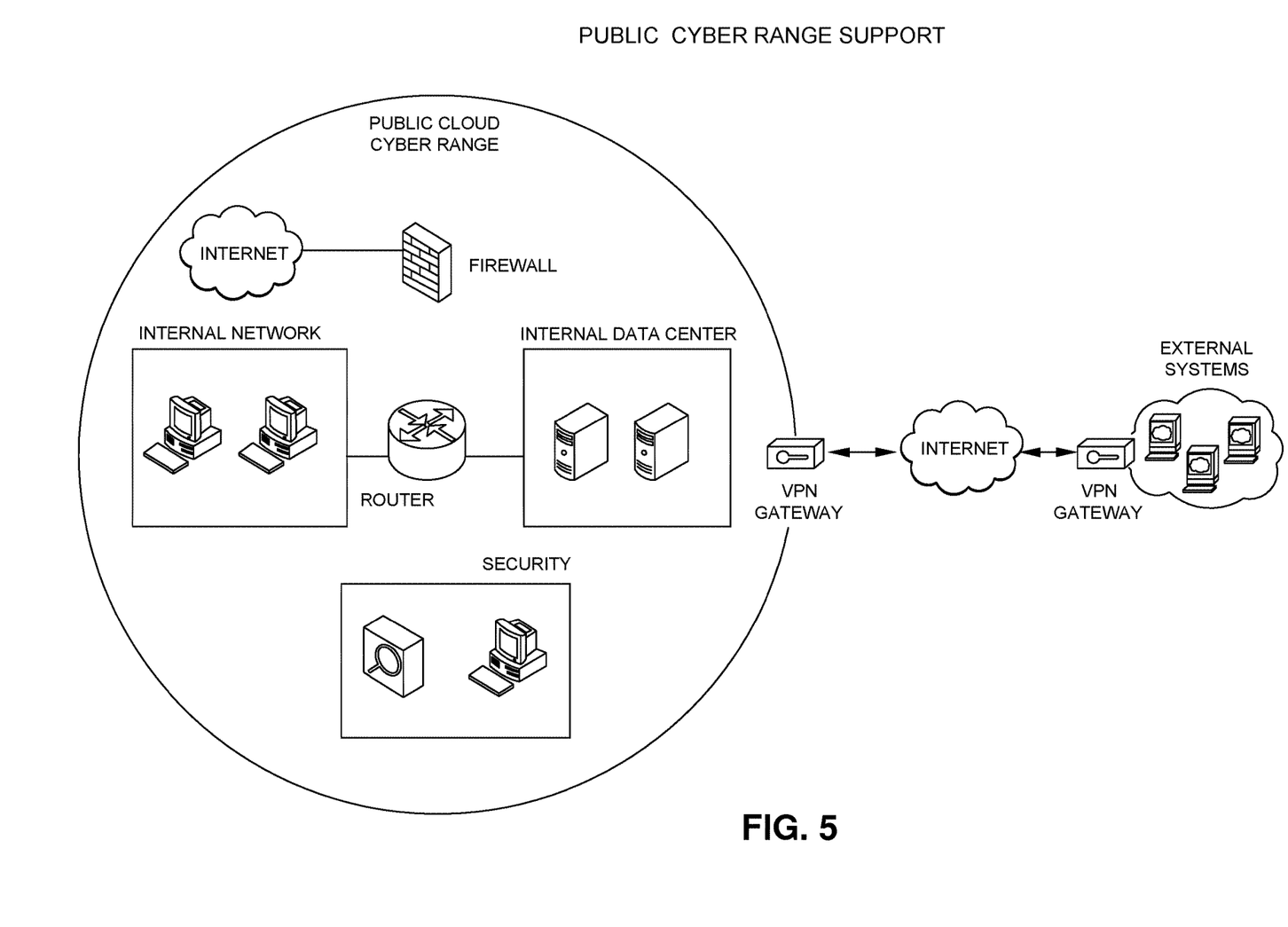
FIG. 5 illustrates aspects of public cloud-based cyber range support in accordance with an embodiment of the invention.

As illustrated in FIG. 5, the presented invention provides a secure VPN connection to integrate external components (virtual or physical) into the cyber range. These attached enclaves support the isolation and containment requirements related to training.

Dynamic Services

In addition to the dynamic range, another aspect of the described invention dynamically changes the services available to add a new dimension to the player experience. Updating services to make them vulnerable or patching them to close vulnerabilities in real time based on AI or management directed heuristics allows for additional changes in the playing field and the challenge.

Unlocking Additional Cyber Range Elements

Another aspect of the invention provides functionality to unlock or add additional cyber range elements based on game play success. Such elements include a network (or set of networks), a new device, or a new service.

Public Cloud Cyber Range Pricing Models

Other aspects of the invention provide novel methods for pricing options and other cyber range training pricing functionality, including: utility pricing based on time/resource usage, discounts/awards based on top performance, play again incentives, threat based pricing where users costs are based on which threats/scenarios are chosen, level(s) and sophistication based charges, dynamic threat selection pricing wherein trainer can adjust threat and complexity, and adding virtual or physical devices and services.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of creating a secure public cloud-based cyber range comprising:
    creating a plurality of subscription-based virtual private networks on each of a plurality of public cloud-based computing platforms which are accessible via a public network, each public cloud-based computing platform of said plurality of public cloud-based computing platforms comprising at least one server;
    creating a cloud-based cyber range relative to each subscription-based virtual private network of said plurality of subscription-based virtual private networks, wherein said cloud-based cyber range has a configuration comprising one or more characteristics, said characteristics comprising one or more services and a topology comprising a set of physical computing components and/or one or more virtual computing components comprising one or more of the following: a network host, a network router, a network switch, a firewall, cyber threat, an internal network, and a system configuration, and wherein said cloud-based cyber range is used to implement a cyber-training exercise having one or more challenges associated with a training objective, relative to a playing field defined by said topology; and
    managing network traffic of said cloud-based cyber range via at least one master controller, said master controller isolating said cloud-based cyber range such that access to the cloud-based cyber range via the public network and access from the cloud-based cyber range to the public network is restricted;
    wherein said topology of said cloud-based cyber range is modifiable based upon at least the training objective of said cloud-based cyber range, and wherein said one or more services are dynamically modifiable to add a new dimension to a player experience of said cyber-training exercise, at least one modification to one of said services comprising making the service vulnerable or patching the service to close vulnerabilities in real time based on Artificial Intelligence (AI) or management directed heuristics so as to change said playing field and at least one of said challenges.

2. The method in accordance with claim 1 wherein said cloud-based cyber range is generated from one or more cyber range templates which define one or more of said characteristics of said cloud-based cyber range.

3. The method in accordance with claim 1 further comprising the step of storing a state of said cloud-based cyber range at a first time and restoring said cloud-based cyber range to said state at a second time later than said first time.

4. A method of creating a secure public cloud-based cyber range comprising:
    creating a virtual private network on a public cloud-based computing platform, said public cloud-based computing platform accessible via a public network;
    generating a cloud-based cyber range on said virtual private network, said cloud-based cyber range having a configuration comprising one or more characteristics, said characteristics comprising one or more services and a topology comprising a set of physical computing components and/or said one or more virtual computing components comprising one or more of the following: a network host, a network router, a network switch, a firewall, cyber threat, an internal network, and a system configuration, and wherein said cloud-based cyber range is used to implement a cyber-training exercise having one or more challenges associated with a training objective, relative to a playing field defined by said topology;
    modifying said topology of said cloud-based cyber range based upon at least the training objective of said cloud-based cyber range, and dynamically modifying one or more services to add a new dimension to a player experience of said cyber-training exercise, at least one modification to one of said services comprising making the service vulnerable or patching the service to close vulnerabilities in real time based on Artificial Intelligence (AI) or management directed heuristics so as to change said playing field and at least one of said challenges;
    restricting, via a master controller, cyber range activities within said cyber range perimeter; and
    restricting, via said master controller, network traffic to said cyber range protocols.

5. The method of claim 4 wherein said cyber threat is either automatically or manually triggered.

6. The method of claim 4 wherein said cyber threat comprises malware.

7. The method of claim 4 wherein said cloud-based cyber range is configured to operate on any router or firewall using a logical mirror.

8. The method of claim 4 further comprising the step of capturing network traffic forensics.

9. The method of claim 4 wherein said cloud-based cyber range further comprises port mirroring to support network monitoring systems and network analysis systems.

10. A method of creating a dynamic cloud-based cyber range comprising:
    creating a first virtual private network on a first cloud-based computing platform which is accessible via a public network;
    generating, on said first virtual private network, a cloud-based cyber range in accordance with a set of cyber range definitions, said set of cyber range definitions comprising a cyber range perimeter, a set of cyber range protocols, and one or more characteristics, said characteristics comprising one or more services and a topology comprising a set of physical computing components and/or said one or more virtual computing components comprising one or more of the following: a network host, a network router, a network switch, a firewall, cyber threat, an internal network, and a system configuration, and wherein said cloud-based cyber range is used to implement a cyber-training exercise having one or more challenges associated with a training objective, relative to a playing field defined by said topology;
    restricting, via a master controller, cyber range activities within said cyber range perimeter;
    restricting, via said master controller, network traffic incoming to and outgoing from the cloud-based cyber range in accordance with said set of cyber range protocols;
    modifying said topology of said cloud-based cyber range based upon at least the training objective of said cloud-based cyber range, and dynamically modifying one or more services to add a new dimension to a player experience of said cyber-training exercise, at least one modification to one of said services comprising making the service vulnerable or patching the service to close vulnerabilities in real time based on Artificial Intelligence (AI) or management directed heuristics so as to change said playing field and at least one of said challenges; and updating said set of cyber range definitions.

11. The method of claim 10 further comprising the step of storing said set of cyber range definitions in cloud storage.

12. The method of claim 11 wherein said set of cyber range definitions stored in cloud storage are used to create said cloud-based cyber range on a second virtual private network.

13. The method of claim 12 wherein said second virtual private network is created relative to a second cloud-based computing platform.

14. The method of claim 13 wherein said second cloud-based computing platform is accessible via said public network.

15. The method of claim 10 wherein said set of cyber range definitions is based on said training objective.

16. The method of claim 15 wherein said updating of said set of cyber range definitions is responsive to updating said training objective.

17. The method of claim 10 wherein said updating of said set of cyber range definitions comprises adding, deleting, or modifying one or more of the following: a network system, a virtual network, and a physical network.

* * * * *